United States Patent
Li et al.

(10) Patent No.: US 11,567,182 B2
(45) Date of Patent: Jan. 31, 2023

(54) LIDAR SAFETY SYSTEMS AND METHODS

(71) Applicant: INNOVUSION IRELAND LIMITED, Los Altos, CA (US)

(72) Inventors: Yufeng Li, Mountain View, CA (US); Yimin Li, Cupertino, CA (US); Rui Zhang, Palo Alto, CA (US); Junwei Bao, Los Altos, CA (US)

(73) Assignee: Innovusion, Inc., Sunnyvale, CA (US)

( * ) Notice: Subject to any disclaimer, the term of this patent is extended or adjusted under 35 U.S.C. 154(b) by 941 days.

(21) Appl. No.: 16/295,803

(22) Filed: Mar. 7, 2019

(65) Prior Publication Data

US 2019/0277953 A1    Sep. 12, 2019

Related U.S. Application Data

(60) Provisional application No. 62/641,033, filed on Mar. 9, 2018.

(51) Int. Cl.
*G01S 7/497* (2006.01)
*G01S 7/481* (2006.01)

(52) U.S. Cl.
CPC ............ *G01S 7/497* (2013.01); *G01S 7/4814* (2013.01); *G01S 7/4817* (2013.01); *G01S 7/4818* (2013.01)

(58) Field of Classification Search
CPC ...... G01S 7/497; G01S 7/4814; G01S 7/4817; G01S 7/4818
USPC ....................................................... 356/5.01
See application file for complete search history.

(56) References Cited

U.S. PATENT DOCUMENTS

| | | |
|---|---|---|
| 3,897,150 A | 7/1975 | Bridges et al. |
| 4,464,048 A | 8/1984 | Farlow |
| 4,923,263 A | 5/1990 | Johnson |
| 5,006,721 A | 4/1991 | Cameron et al. |
| 5,157,451 A | 10/1992 | Taboada |
| 5,319,434 A | 6/1994 | Croteau et al. |
| 5,369,661 A | 11/1994 | Yamaguchi et al. |
| 5,442,358 A | 8/1995 | Keeler et al. |

(Continued)

FOREIGN PATENT DOCUMENTS

| | | |
|---|---|---|
| CN | 204758260 U | 11/2015 |
| CN | 204885804 U | 12/2015 |

(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

(Continued)

*Primary Examiner* — Daniel L Murphy
(74) *Attorney, Agent, or Firm* — Mauriel Kapouytian Woods LLP; Wensheng Ma; Liang Huang

(57) ABSTRACT

Embodiments discussed herein refer to LiDAR systems and methods that monitor for fault conditions that could potentially result in unsafe operation of a laser. The systems and methods can monitor for faulty conditions involving a transmitter system and movement of mirrors in a scanning system. When a fault condition is monitored, a shutdown command is sent to the transmitter system to cease laser transmission. The timing by which the laser should cease transmission is critical in preventing unsafe laser exposure, and embodiments discussed herein enable fault detection and laser shutoff to comply with laser safety standards.

21 Claims, 9 Drawing Sheets

(56) References Cited

U.S. PATENT DOCUMENTS

| | | |
|---|---|---|
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Tomohiro |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di Teodoro et al. |
| 7,489,865 B2 | 2/2009 | Varshneya et al. |
| 7,502,395 B2 | 3/2009 | Cheng et al. |
| 7,508,496 B2 | 3/2009 | Mettenleiter et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,994,928 B2 | 3/2015 | Shiraishi |
| 9,048,616 B1 | 6/2015 | Robinson |
| 9,086,273 B1 | 7/2015 | Gruver et al. |
| 9,121,703 B1 | 9/2015 | Droz et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,823,353 B2 | 11/2017 | Eichenholz et al. |
| 9,869,754 B1 | 1/2018 | Campbell et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,094,925 B1 | 10/2018 | LaChapelle |
| 10,157,630 B2 | 12/2018 | Vaughn et al. |
| 10,185,027 B2 | 1/2019 | O'Keeffe |
| 10,191,155 B2 | 1/2019 | Curatu |
| 10,215,847 B2 | 2/2019 | Scheim et al. |
| 10,295,656 B1 | 5/2019 | Li et al. |
| 10,310,058 B1 | 6/2019 | Campbell et al. |
| 10,324,170 B1 | 6/2019 | Enberg, Jr. et al. |
| 10,324,185 B2 | 6/2019 | McWhirter et al. |
| 10,393,877 B2 | 8/2019 | Hall et al. |
| 10,422,865 B2 | 9/2019 | Irish et al. |
| 10,429,495 B1 | 10/2019 | Wang et al. |
| 10,451,716 B2 | 10/2019 | Hughes et al. |
| 10,502,831 B2 | 12/2019 | Eichenholz |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,732,281 B2 | 8/2020 | LaChapelle |
| 10,908,262 B2 | 2/2021 | Dussan |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,016,192 B2 | 5/2021 | Pacala et al. |
| 11,035,935 B2 | 6/2021 | Hinderling |
| 2002/0136251 A1 | 9/2002 | Green et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di Teodoro et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik |
| 2016/0291134 A1 | 10/2016 | Droz et al. |

(56) References Cited

U.S. PATENT DOCUMENTS

| | | |
|---|---|---|
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0156896 A1 | 6/2018 | O'Keeffe |
| 2018/0158471 A1 | 6/2018 | Vaughn et al. |
| 2018/0164439 A1 | 6/2018 | Droz et al. |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2000411 | 1/1979 |
| JP | 2007144667 A | 6/2007 |
| JP | 2010035385 A | 2/2010 |
| JP | 2017-003347 A | 1/2017 |
| JP | 2017-138301 A | 8/2017 |
| KR | 10-2010-0096931 A | 9/2010 |
| KR | 10-2012-0013515 A | 2/2012 |
| KR | 10-2013-0068224 A | 6/2013 |
| KR | 10-2018-0107673 A | 10/2018 |
| WO | 02/101408 A1 | 12/2002 |
| WO | 2017/110417 A1 | 6/2017 |
| WO | 2018/125725 A1 | 7/2018 |
| WO | 2018/126248 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |

OTHER PUBLICATIONS

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.

International Preliminary Report on Patentability, dated Jul. 9, 2019, for International Application No. PCT/US2018/012703, 10 pages.

International Preliminary Report on Patentability, dated Jul. 9, 2019, for International Application No. PCT/US2018/012704, 7 pages.

International Preliminary Report on Patentability, dated Jul. 9, 2019, for International Application No. PCT/US2018/012705, 7 pages.

International Search Report and Written Opinion, dated Jan. 17, 2020, for International Application No. PCT/US2019/019276, 14 pages.

International Search Report and Written Opinion, dated Jul. 9, 2019, for International Application No. PCT/US2019/018987, 17 pages.

International Search Report and Written Opinion, dated Sep. 18, 2018, for International Application No. PCT/US2018/012116, 12 pages.

International Search Report and Written Opinion, dated May 3, 2019, for International Application No. PCT/US2019/019272, 16 pages.

International Search Report and Written Opinion, dated May 6, 2019, for international Application No. PCT/US2019/019264, 15 pages.

International Search Report and Written Opinion, dated Jan. 3, 2019, for International Application No. PCT/US2018/056577, 15 pages.

International Search Report and Written Opinion, dated Mar. 23, 2018, for International Application No. PCT/US2018/012704, 12 pages.

International Search Report and Written Opinion, dated Jun. 7, 2018, for International Application No. PCT/US2018/024185, 9 pages.

International Preliminary Report on Patentability, dated Apr. 30, 2020, for International Application No. PCT/US2018/056577, 8 pages.

European Search Report, dated Jul. 17, 2020, for EP Application No. 18776977.3, 12 pages.

Extended European Search Report, dated Jul. 10, 2020, for EP Application No. 18736738.8, 9 pages.

Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.

Extended European Search Report, dated Jul. 22, 2020, for EP Application No. 18736685.1, 10 pages.

Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.

Office Action Issued in Japanese Patent Application No. 2019-536019 dated Nov. 30, 2021, 6 pages.

European Search Report, dated Jun. 17, 2021, for EP Application No. 18868896.4, 7 pages.

"Fiber laser," Wikipedia, https://en.wikipedia.org/wiki/Fiber_laser, 6 pages.

International Search Report and Written Opinion, dated Mar. 19, 2018, for International Application No. PCT/US2018/012705, 12 pages.

(56) References Cited

OTHER PUBLICATIONS

International Search Report and Written Opinion, dated Mar. 20, 2018, for International Application No. PCT/US2018/012703, 13 pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.

LIDAR SAFETY SYSTEMS AND METHODS

CROSS-REFERENCE TO A RELATED APPLICATION

This application claims the benefit of U.S. Provisional Application No. 62/641,033, filed Mar. 9, 2018, the disclosure of which is incorporated herein in its entirety.

FIELD OF THE INVENTION

The present disclosure relates to light detection and ranging (LiDAR), and in particular to LiDAR systems and methods.

BACKGROUND

Systems exist that enable vehicles to be driven semi-autonomously or fully autonomously. Such systems may use one or more range finding, mapping, or object detection systems to provide sensory input to assist in semi-autonomous or fully autonomous vehicle control. LiDAR systems, for example, can provide the sensory input required by a semi-autonomous or fully autonomous vehicle. LiDAR systems can use a laser that projects beams of light. As LiDAR system become more ubiquitous, safe operation of the laser is desired.

BRIEF SUMMARY

Embodiments discussed herein refer to LiDAR systems and methods that monitor for fault conditions that could potentially result in unsafe operation of a laser. The systems and methods can monitor for faulty conditions involving a transmitter system and movement of mirrors in a scanning system. When a fault condition is monitored, a shutdown command is sent to the transmitter system to cease laser transmission. The timing by which the laser should cease transmission is critical in preventing unsafe laser exposure, and embodiments discussed herein enable fault detection and laser shutoff to comply with laser safety standards.

In one embodiment, a LiDAR system is provided that can include a fiber laser, a scanning system including a first rotating mirror and a second rotating mirror, wherein the first rotating mirror is operative to redirect laser pulses originating from the fiber laser towards the second rotating mirror, and wherein the second rotating mirror projects the laser pulses externally from the scanning system. The LiDAR system can include monitoring circuitry coupled to the first rotating mirror, the second rotating mirror, and the transmitter system. The monitoring circuitry is operative to monitor the first rotating mirror, the second rotating mirror, and the transmitter system for a fault condition, detect occurrence of the fault condition, and instruct the fiber laser to shut down in response to a detected fault condition.

In one embodiment, a method for operating a LiDAR system is provided by operating a first drive mechanism to control movement of a first mirror, operating a second drive mechanism to control movement of a second mirror, and activating a laser transmitter system comprising a fiber laser, wherein the fiber laser transmits light pulses that are projected according to a field of view defined by the controlled movements of the first and second mirrors. The method can include monitoring the first drive mechanism, the second drive mechanism, and the transmitter system for a fault condition, detecting occurrence of the fault condition, and instructing the fiber laser to shut down in response to a detected fault condition.

In one embodiment, a LiDAR system is provided that can include a fiber laser, at least a first mirror operative to move according to a first motor motion, wherein the at least the first mirror at least partially controls directionality of laser pulses originating from the fiber laser, and monitoring circuitry. The monitoring circuitry can be operative to monitor the first motor motion and the transmitter system for a fault condition, detect occurrence of the fault condition, and instruct the fiber laser to shut down in response to a detected fault condition.

In one embodiment, a method for operating a LiDAR system is provided for controlling movement of a first mirror according to a first motion; activating a laser transmitter system comprising a fiber laser, wherein the fiber laser transmits light pulses that are projected according to a field of view defined by the controlled movements of at least the first mirror; monitoring movement of the first mirror and operation of the transmitter system for a fault condition; detecting occurrence of the fault condition; and turning the fiber laser off in response to a detected fault condition.

A further understanding of the nature and advantages of the embodiments discussed herein may be realized by reference to the remaining portions of the specification and the drawings.

DETAILED DESCRIPTION

Illustrative embodiments are now described more fully hereinafter with reference to the accompanying drawings, in which representative examples are shown. Indeed, the disclosed LiDAR systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Figure 1:
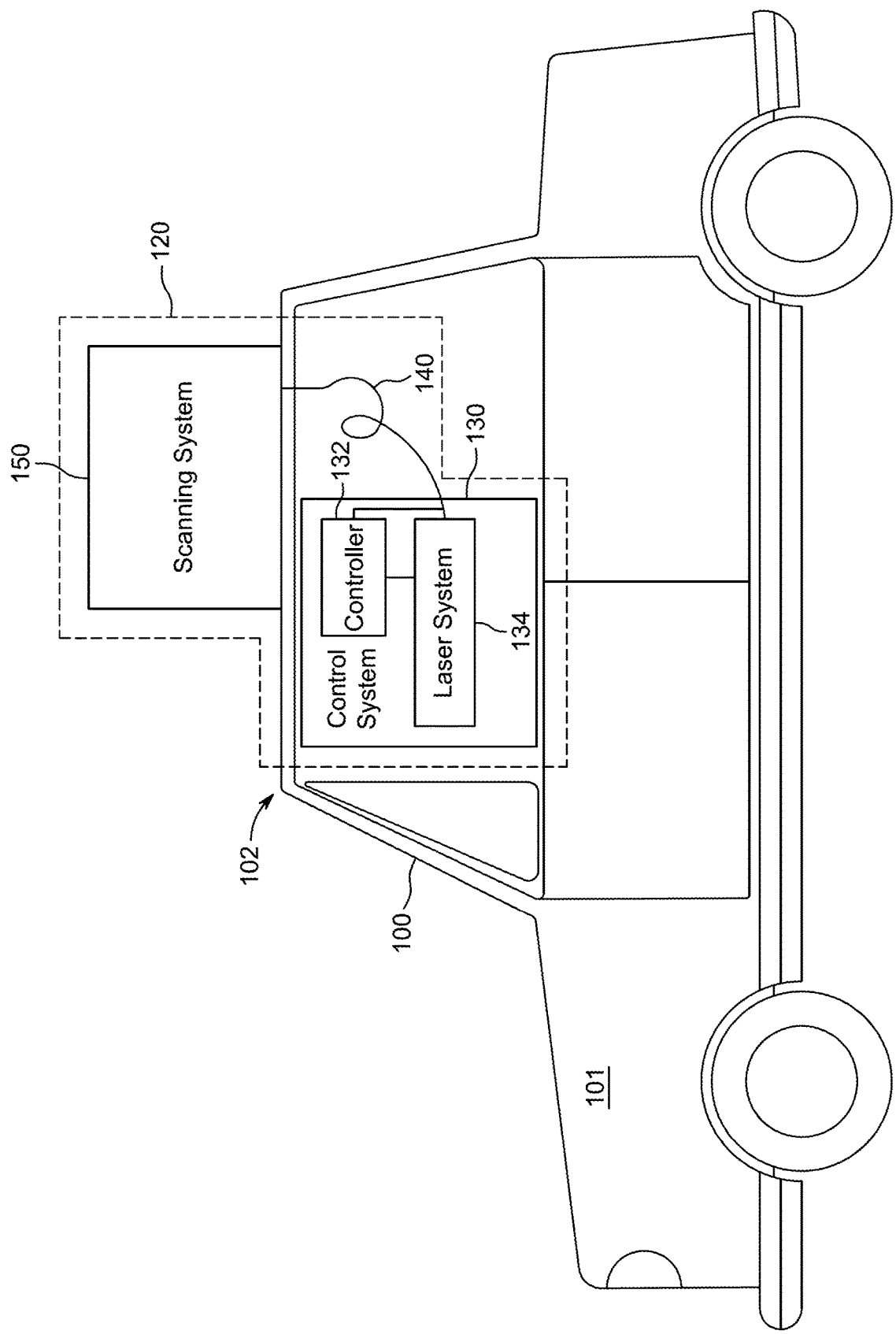
FIG. 1 shows an illustrative vehicle having a LiDAR system that is attached to and/or incorporated therein, according to an embodiment.

FIG. 1 shows an illustrative vehicle 100 having a LiDAR system 120 that is attached to and/or incorporated therein according to an embodiment. Vehicle 100 can be generically classified as having interior portion 101 and exterior portion 102. Interior portion 101 may be portions of vehicle 100 that are not directly exposed to external environmental factors such as the environment conditions (e.g., water, humidity, sun, ice, wind, etc.) and road conditions (e.g., road debris). Interior portion 101 may be influenced by external environment conditions but to a lesser degree than exterior portion 102. LiDAR system 120 may include, among other features, control system 130, cable system 140, and scanning system 150. Control system 130 may be contained within interior portion 101, scanning system 150 may be mounted to exterior portion 102, and cable system 140 may exist solely within interior portion 101 or can exist as part of interior portion 101 and exterior portion 102. This arrangement is illustrative and in some embodiments, control system 130 or portions thereof (e.g., laser system 132) can be mounted to exterior portion 102.

Control system 130 can include controller 132 and laser system 134. Controller 132 and laser system 134 may be coupled to scanning system 150 via cable system 140. Laser system 134 may transmit light pulses through cable system 140 to scanning system 150. Laser system 134 may use diode lasers to generate light pulses or fiber lasers. Controller 132 may control a current source at which laser system 134 transmits its light pulses. Controller 132 may receive detector signals from scanning system 150 via cable system 140. The detector signals may be the return or consequence signals that are detected by one or more detectors when the transmitted light pulses bounce of an object being observed by scanning system 150. Scanning system 150 may include the appropriate lenses, mirrors, steering optics, and detectors needed to capture an image of a scene existing within a vicinity of vehicle 100.

In some embodiments, LiDAR system 120 can separate laser system 134 and scanning system 150 from each other such that laser system 134 is contained within interior portion 101. Keeping laser system 134 (and other components associated with control system 130) within interior portion 101 provides an environment that is less harsh than that of exterior portion 102. This provides cooling advantages over containing laser system 134 as part of scanning system 150, which is located on exterior portion 102. Laser system 132 can use diode lasers or fiber lasers, and the light pulses are transmitted through cable system 140 to scanning system 150. Cable system 140 can include one or more fiber optic cables for transmitting light pulses from laser system 134 to scanning system 150. Cable system 140 can include one or more electrical conduits for transferring electrical signals between control system 130 and scanning system 150. For example, control system 130 may provide instructions to scanning system 150 to control steering optics. As another example, scanning system 150 may provide detection signals to controller 132 via cable system 140.

During normal operation, the laser is projected in front of vehicle 100 in accordance with the field of view of scanning system 150. The field of view includes lateral and vertical fields of view in which laser pulses are transmitted to capture an X×Y image every scan cycle. This X×Y image is obtained each scan cycle and any objects detected with the image are detected by returns of the laser pulses. The images are processed by software to determine the location and distance of the objects. When LiDAR system 120 is operating within normal operating parameters, the projection of the laser pulse across the scanning system's field of view occurs very fast and as a result the power output of LiDAR system 120 falls within exposure limits specified, for example, for Class 1 lasers as defined in the IEC 60825.1-2007 protocol. That is, there is no danger presented by the laser pulses when the system is operating under normal conditions. There may be situations, however, when the laser transmission must be shut off to comply with laser emission safety levels. For example, a vehicle crash that compromises a portion of the LiDAR system may necessitate rapid deactivation of the laser transmission system. As another example, component failure that compromises the LiDAR system's ability to project the laser pulses according to the system's field of view may require rapid deactivation of the laser transmission system. As yet another example, the laser transmission system itself may be compromised (e.g., a fiber optic cable is severed), which may require rapid deactivation of the laser transmission system. Embodiments discussed herein describe different mechanism for detecting faults and shutting down the laser transmitter system in response to a detected fault.

Figure 2:
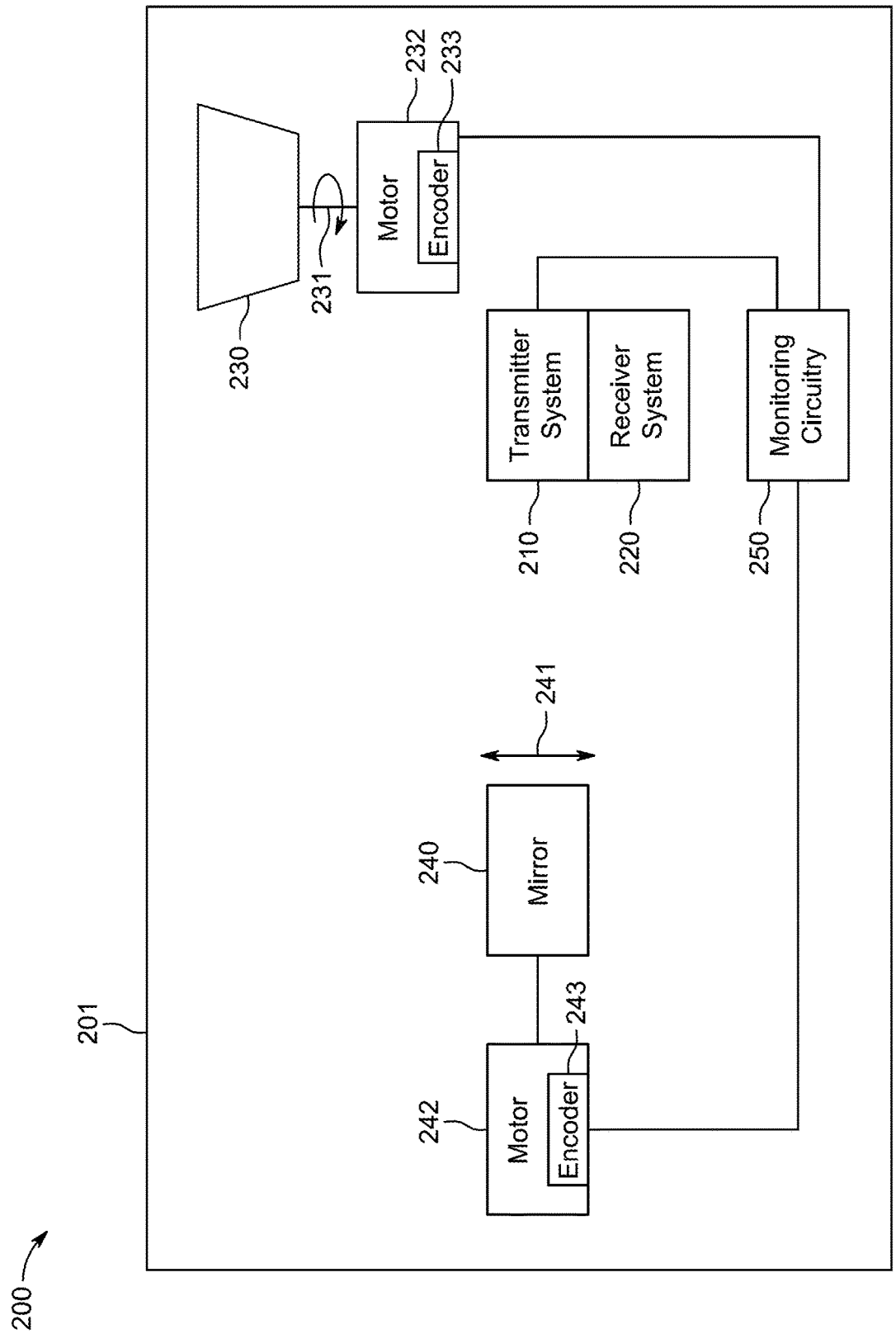
FIG. 2 shows an illustrative scanning system according to an embodiment.

FIG. 2 shows illustrative scanning system 200 according to an embodiment. Scanning system 200 can include housing 201, circuit board 210, transceiver module 220, and polygon structure 230. Housing 201 is constructed to house circuit board 210, transceiver module 220, and polygon structure 230 and can be mounted to a windshield or to other structures located on a vehicle. Circuit board 210 may include circuitry such as control electronics, power electronics, communications circuitry, power and data busses, and any other components. In some embodiments, circuit board 210 may be a metal based circuit board to assist in heat dissipation (e.g., when silicon based laser emitters are used).

FIG. 2 shows illustrative scanning system 200 according to an embodiment. Scanning system 200 can include housing 201, transmitter system 210, receiver system 220, polygon structure 230, movement mechanism 232, mirror 240, movement mechanism 242, and monitoring circuitry 250. A circuit board (not shown) may include circuitry such as control electronics, power electronics, communications circuitry, power and data busses, and any other components. In some embodiments, circuit board 210 may be a metal based circuit board to assist in heat dissipation (e.g., when silicon based laser emitters are used). Housing 201 is constructed to house transmitter system 210, receiver system 220, polygon structure 230, motor 232, mirror 240, motor 242, and monitoring circuitry 250 and can be mounted to a windshield or to other structures located on a vehicle.

Transmitter system 210 may be operative to direct light energy towards mirror 240 and receiver system 220 is operative to receive reflected light energy from mirror 240. Mirror 240 is operative to redirect light energy transmitted from transmitter system 210 to polygon structure 230. Mirror 240 is also operative to redirect light energy received from polygon structure 230 to receiver system 220. Mirror 240 may be moved in the directions shown by arrow 241. As mirror 240 oscillates back and forth, it causes light being transmitted by transmitter system 210 to interface with different portions of polygon structure 230. During operation of system 200, light energy is emitted by transmitter system 210 towards mirror 240, which redirects the light to polygon structure 230, which redirects the light energy out of housing 201. The light energy being directed by polygon structure 230 is cast in accordance with the field of view parameters of scanning system 200. That is, if system 200 has a field of view with range of x, a lateral angle of y, and vertical angle of z, the range x can be controlled by the power of transmitter system 210, the vertical angle z can be controlled by the movement of mirror 240, and the lateral angle y can be controlled by polygon structure 230. Light energy that is reflected back from objects in the field of view and returns to polygon structure 230 where it is directed back to mirror 240, which redirects it back to receiver system 220. Both polygon 230 and mirror 240 may be referred to as rotating mirrors.

Transmitter system 210 represents a source of laser light that is used by scanning system 200 to observe objects in the system's field of view. In some embodiments, transmitter system 210 may be a fully self-contained laser system (e.g., such as laser system 134 that include laser generating elements such as photo diodes or a fiber laser and transmission optics) that includes an end-to-end transmission solution. In other embodiments, transmitter system 210 may represent a terminal end of a laser transmission system in which transmitter system 210 includes a fiber coupling and collimating optics that direct the laser to mirror 240, but does not include the laser generating elements. The laser generating elements may be maintained separate from scanning system 200 (e.g., as shown in FIG. 1).

Receiver system 220 can include receiver optics and one or more detectors (e.g., photo diodes) that detect returns. The outputs of the one or more detectors can be provided to a control system (e.g., control system 130) to enable processing of return pulses.

Polygon structure 230 may be constructed from a metal such as aluminum, plastic, or other material that can have a polished or mirrored surface. Polygon structure 230 may be selectively masked to control the lateral dispersion of light energy being projected in accordance with the field of view of scanning system 200. Polygon structure 230 can include a number of facets to accommodate a desired horizontal field of view (FOV). The facets can be parallel or non-parallel to its symmetric axis. Polygon structure 230 is operative to spin about axis 231 in a first direction at a substantially constant speed. Axis 231 can be coincident to the symmetrical axis of structure 230 or it can be tilted at an angle with respect to the symmetrical axis of structure 230, which can effectively increase resolution in vertical angle of z. The shape of polygon structure 230 can be trimmed (e.g., chop off the sharp corner or tip to reduce overall weight, chamfer the sharp edge to reduce air resistance) for better operation performance. Polygon structure 230 may sometime be referred to herein as a mirror.

Mirror 240 may be a single plane or multi-plane mirror that oscillates back and forth to redirect light energy emitted by transmitter system 210 to polygon 230. The single plane mirror may provide higher resolutions at the top and bottom portions of the vertical field of view than the middle portion, whereas the multi-plane mirror may provide higher resolution at a middle portion of the vertical field of view than the top and bottom portions.

Movement mechanism 232 may be responsible for controlling the spin, movement, or rotation of structure 230. Movement mechanism 232 may be, for example, a motor such as a DC motor and may have encoder 233 associated with it. Movement mechanism 242 may be responsible for controlling the movement, rotation, or oscillations of mirror 240. Movement mechanism 242 may also be a motor such as a DC motor. An encoder such as encoder 243 may be associated with the motor.

In some embodiments, scanning system 200 may use only one motor driven element to redirect light pulses originating from transmitter system 210. For example, motor 242 and minor 240 may be replaced with a static component that is able to control redirection of light pulses. Alternatively, as another example, polygon 230 and motor 232 may be replaced with a static component that is able to control redirection of light pulses. It should be understood that embodiments that use only one motor driven element may operate according to a different set of safety parameters than a system that uses two motor driven elements.

Monitoring circuitry 250 may be connected to transmitter system 210, mirror 240, and polygon 230. Monitoring circuitry 250 is able determine whether a fault condition exist with each of the transmitter system 210, mirror 240, and polygon 230, and if such a fault condition is detected, it can instruct transmitter system 210 to shut down. In one embodiment, monitoring circuitry 250 may be connected to transmitter system 210, encoder 233, and encoder 243. Monitoring circuitry 250 can monitor encoders 233 and 243 to ascertain whether motors 230 and 240, respectively, are operating properly. If a motor is not operating properly, monitoring circuitry 250 may detect the malfunctioning motor via its encoder and instruct transmitter system 210 to cease laser transmission. Monitoring circuitry 250 may also monitor transmitter system 210 to ensure that its operation has not been compromised. For example, if a fiber optic cable that is carrying laser pulses from a transmission source to a transmission destination is broken or compromised, monitoring circuitry 250 may be able detect the broken cable and instruct transmitter system 210 to cease transmission.

The reaction time required to fully shutdown laser transmitter system may vary depending on which fault condition(s) are monitored. For example, if only one of mirrors 230 or 240 stops moving or begins to decelerate in movement velocity, scanning system 200 may be afforded more reaction time to shutdown laser transmitter system 210 than if both of mirrors 230 and 240 stop moving or begin to decelerate in movement velocity. If one of mirrors 230 or 240 is still functioning properly, system 200 is permitted a first period of time or a second period of time to shut down its laser transmitter system. The first period of time corresponds to shut down of mirror 230 and the second period of time corresponds to shut down of mirror 240. The first and second periods of time may be different or the same. If only one mirror is operating properly, the system may still be considered to be operating as a scanning system because the laser pulses are still being projected along either lateral field of view of the vertical field of view.

The shutdown times for mirrors 230 and 240 may be different due to their construction and operational speeds. If mirror 240 stops operating, the laser pulses will continue to be distributed by mirror 230. As a result, the laser pulses will be fixed in one particular vertical angle within the field of view, but will be spread out across the entire horizontal field of view. Thus, the laser pulses will repeatedly cycle through the horizontal field of view for the same vertical angle. With knowledge of the laser distribution pattern when mirror 240 is not operating properly, calculations can be made to define the second period of time. If mirror 230 stops operating, laser pulses will vary along the vertical field of view at a fixed angle along the horizontal field of view. Thus, the laser pulses will repeatedly cycle through the vertical field of view for same horizontal angle. With knowledge of the laser distribution pattern when mirror 230 is not operating properly, calculations can be made to define the first period of time.

If both mirrors 230 and 240 are not functioning properly, system 200 is permitted a third period of time to shut down its laser transmitter system, where the third period of time is less than the first and second periods of time. When both mirrors 230 and 240 not ftmctioning properly, the system will generate a static, collimated beam. The collimated beam is a reason for requiring the laser transmitter system to shut down within the third period of time.

Figure 3A:
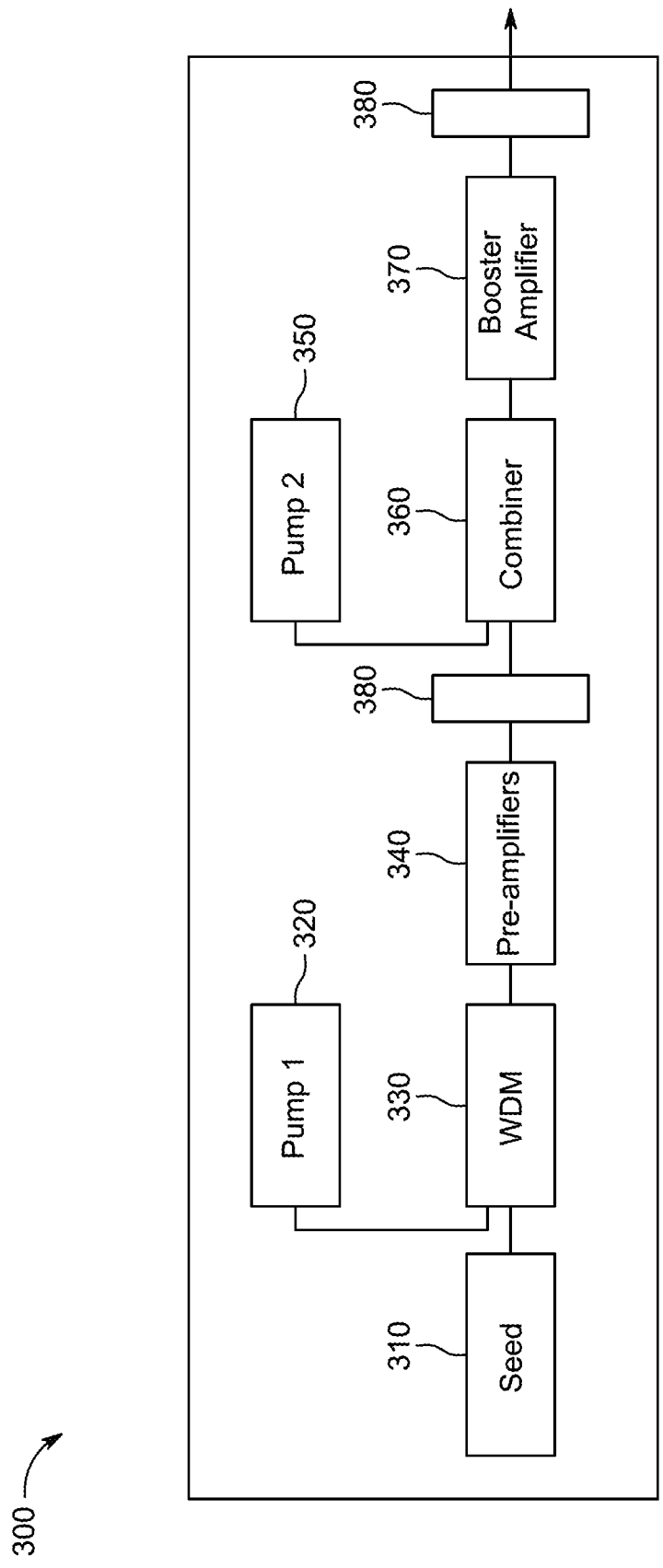
FIG. 3A shows illustrative a fiber laser according to an embodiment.
Figure 3B:
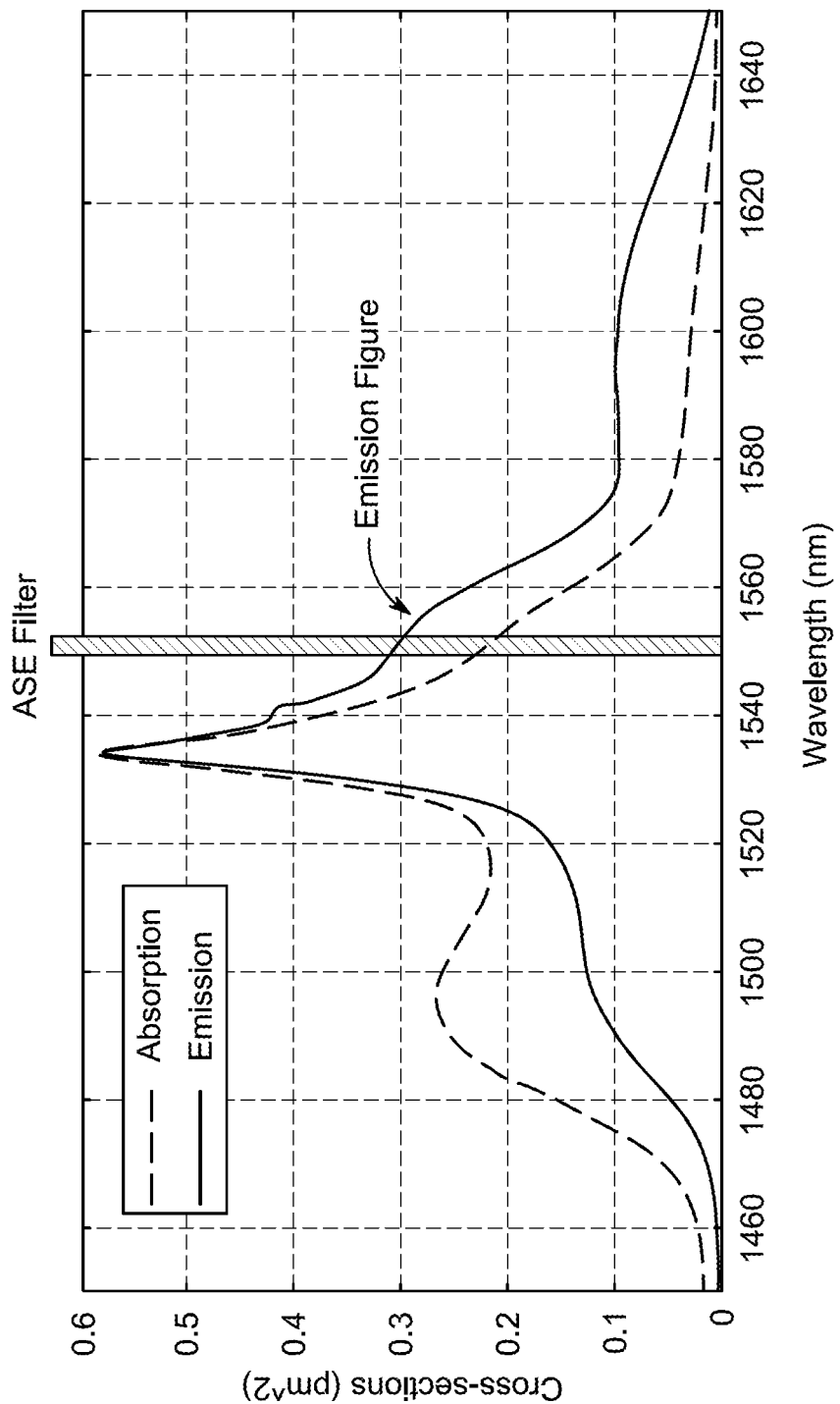
FIG. 3B shows an illustrative waveform diagram, according to an embodiment.

FIG. 3A shows illustrative fiber laser 300 according to an embodiment. Fiber laser 300 can include several components necessary to generate a laser with sufficient power. In one embodiment, fiber laser 300 can include a seed laser, at least one stage of an amplifier, and an amplified spontaneous emission (ASE) filter that is positioned downstream of the amplifier. In the embodiment shown in FIG. 3A, fiber laser 300 can include seed laser 310, pump 320, wavelength division multiplexor 330, pre-amplifier 340, pump 350, combiner 360, and booster amplifier 370. Fiber laser 300 also can include amplified spontaneous emission (ASE) filter 380, which can be located immediately downstream from pre-amplifier 340 or immediately downstream from booster amplifier 370. Both locations of ASE filter 380 are shown in FIG. 3A, but it should be understood that only one such ASE filter 380 is needed. During operation, the output of seed laser 310 is amplified through a combination of pump 320, wavelength division multiplexor 330, pre-amplifier 340, pump 350, combiner 360, and booster amplifier 370. ASE is created as a byproduct of the operation of pump 320, wavelength division multiplexor 330, pre-amplifier 340, pump 350, combiner 360, and booster amplifier 370. The ASE exists for a range of wavelengths, including desired and undesired wavelengths. See FIG. 3B, which shows an illustrative waveform diagram showing ASE as a function of wavelength according to an embodiment. FIG. 3B shows that ASE filter 380 functions as a bandpass filter to filter out the undesired ASE and thereby only allow desired wavelengths of light energy to pass.

When fiber laser 300 is instructed to shut down and cease emitting a laser, its seed laser 310 can be turned off substantially immediately. However, residual ASE can exist within fiber laser 300 for a fixed period of time after the shutdown instruction has been received. Pumps 320 and 350 may not be able to immediately deactivate in response to a shutdown command and thus may continue to inject energy into fiber laser 300 for a period of time after the shutdown command is received. Despite the existence of the residual energy, ASE filter 380 can filter out the out of band residual energy, thereby reducing the residual energy being emitted by fiber laser 300 to a level deemed safe for operation of a LiDAR system.

Figure 4:
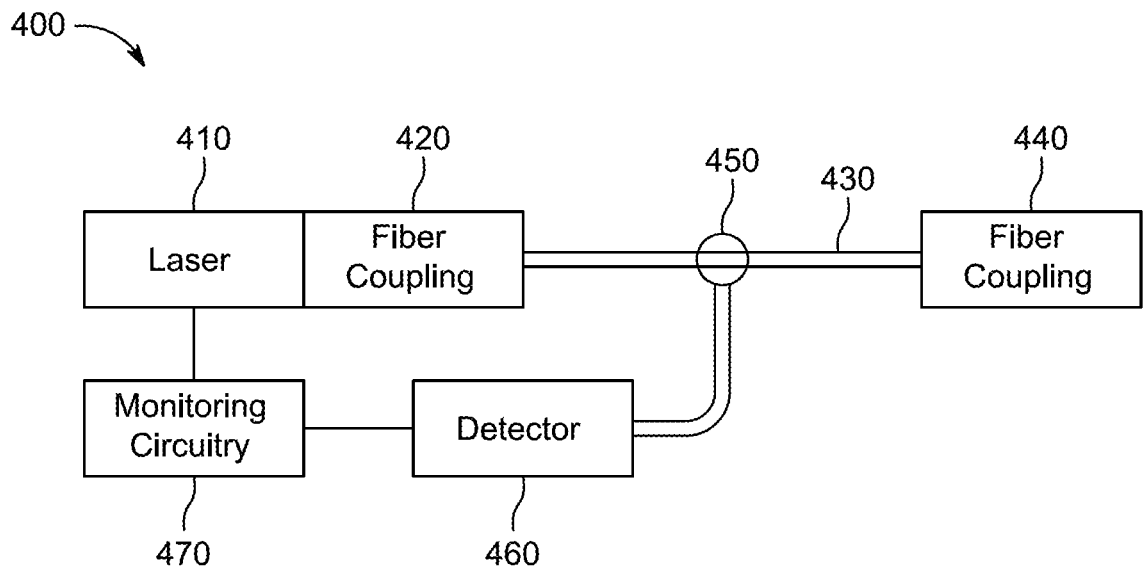
FIG. 4 shows an illustrative schematic diagram of a transmitter system, according to an embodiment.

FIG. 4 shows an illustrative schematic diagram of transmitter system 400 according to an embodiment. Transmitter system 400 can include fiber laser 410, fiber coupling 420, fiber optic cable 430, fiber coupling 440, circulator 450, detector 460, and monitoring circuitry 470. The arrangement of transmitter 400 is set up to monitor changes in reflectivity in fiber optic cable 430 to ascertain whether transmitter system 400 has been compromised. Transmitter 400 is designed to monitor laser performance on the laser generation side of the system and not on the laser destination side of the system. Circulator 450 can replicate the conditions of fiber optic cable 430 for processing by detector 460. Detector 460 can monitor the reflectively of fiber optic cable 430 by way of circulator 450 and provide its output to monitoring circuitry 470. Monitoring circuitry 470 can monitor for a sudden changes in reflectivity and cause laser 410 to shut down in response to reflectivity changes that exceed a fixed threshold.

Figure 5:
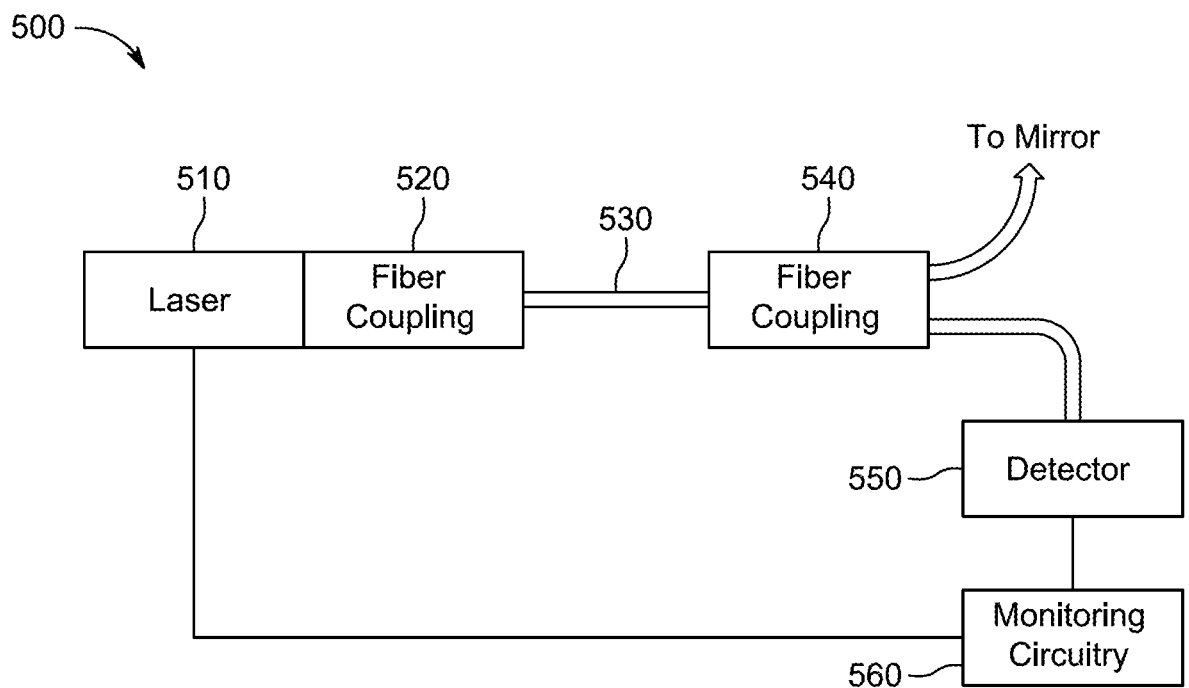
FIG. 5 shows an illustrative schematic diagram of another transmitter system, according to an embodiment.

FIG. 5 shows an illustrative transmitter system 500 according to an embodiment. System 500 can include fiber laser 510, fiber coupling 520, fiber optic cable 530, fiber coupling 540, detector 550, and monitoring circuitry 560. The arrangement of transmitter 400 is set up to monitor pulses in fiber optic cable 430 to ascertain whether transmitter system 400 has been compromised (e.g., fiber optic cable 430 has been severed). Transmitter 500 is designed to monitor laser performance on the laser destination side of the system and not on the laser generation side of the system. At fiber coupling 540, a large portion of the laser energy is directed to a mirror (e.g., mirror 240) and a small portion of the laser energy is directed to detector 550. Detector 550 can detect light pulses being transmitted through fiber optic cable 530. The output of detector 550 is provided to monitoring circuitry 560. Monitoring circuitry 560 can determine whether a steady stream of pulses are observed and when it determines that is an interruption in the stream of pulses, it can instruct laser 510 to shut down.

Figure 6:
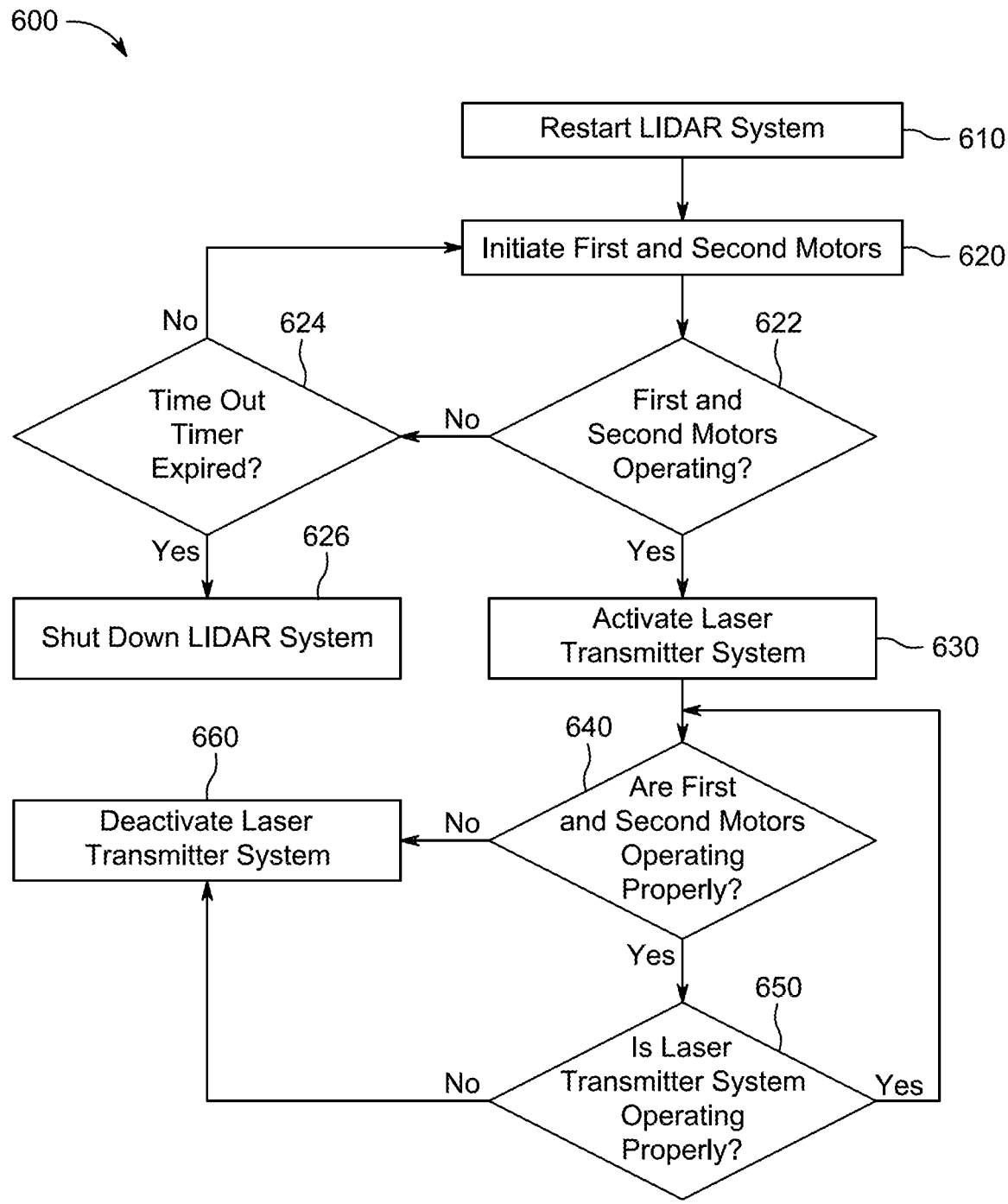
FIG. 6 shows an illustrative process, according to an embodiment.

FIG. 6 shows an illustrative process 600 according to an embodiment. Starting at step 610, a LiDAR system is restarted. After LiDAR system is restarted, the first and second motors are initiated, as indicated by step 620. For example, motors 232 and 242 may turn on and begin spinning. At step 622, a determination is made as to whether the first and second motors are operating according to predetermined parameters. In embodiments where the LiDAR system uses only one motor as part of its scanning system, step 622 may be modified to determine whether that lone motor is operating. If the determination is NO, process 600 can determine whether a timeout timer has expired at step 624. The timeout timer provides the motors a finite amount of time to get up to speed. If the timeout timer has not expired, process 600 reverts back to step 620. If the timeout timer has expired at step 624, process 600 may shutdown the LiDAR system, as indicated by step 626. The LiDAR system may be shut down because the motors did not achieve the desired operational status and thus it would be unsafe to activate the laser transmitter system.

Figure 7:
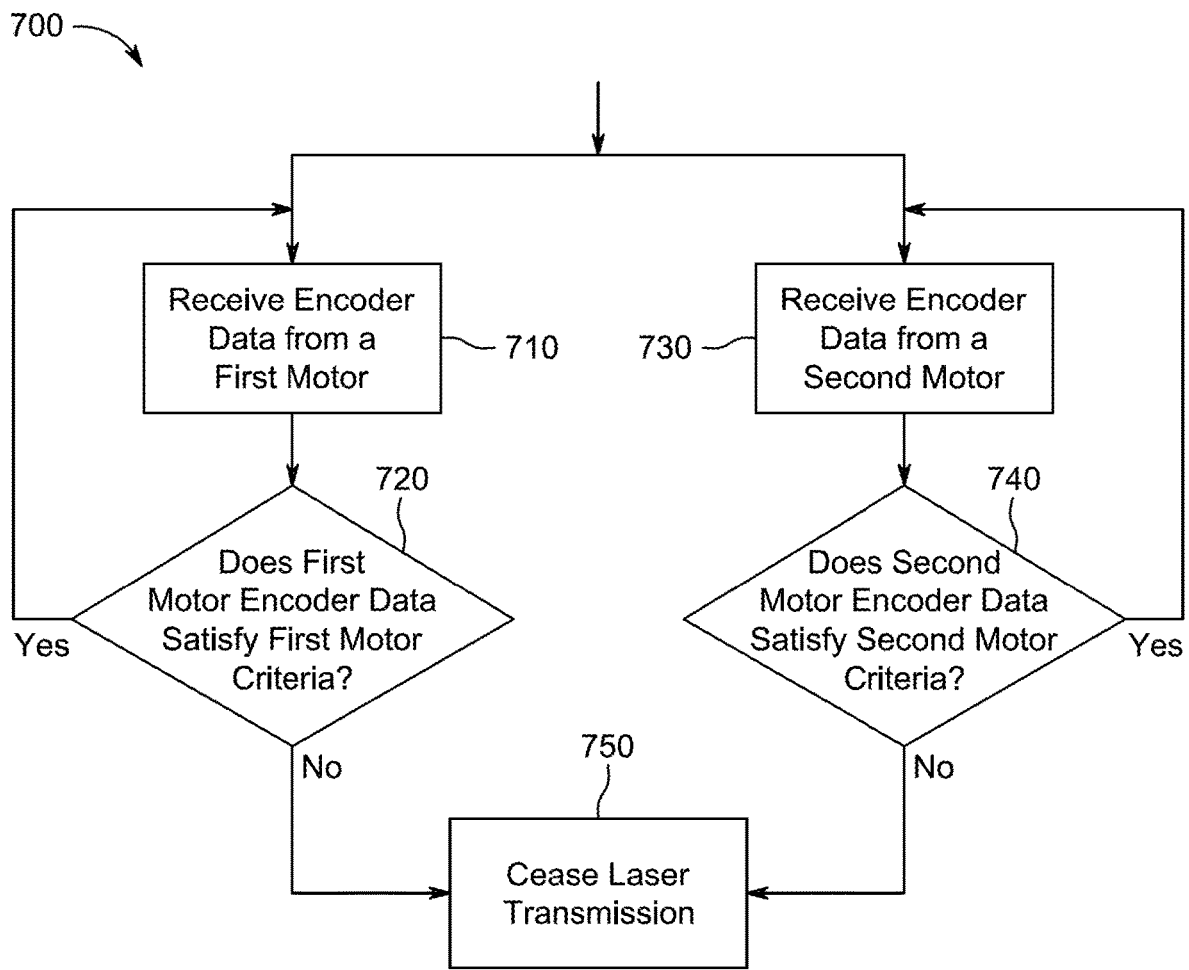
FIG. 7 shows an illustrative process for monitoring mirrors for proper operation, according to various embodiments.
Figure 8:
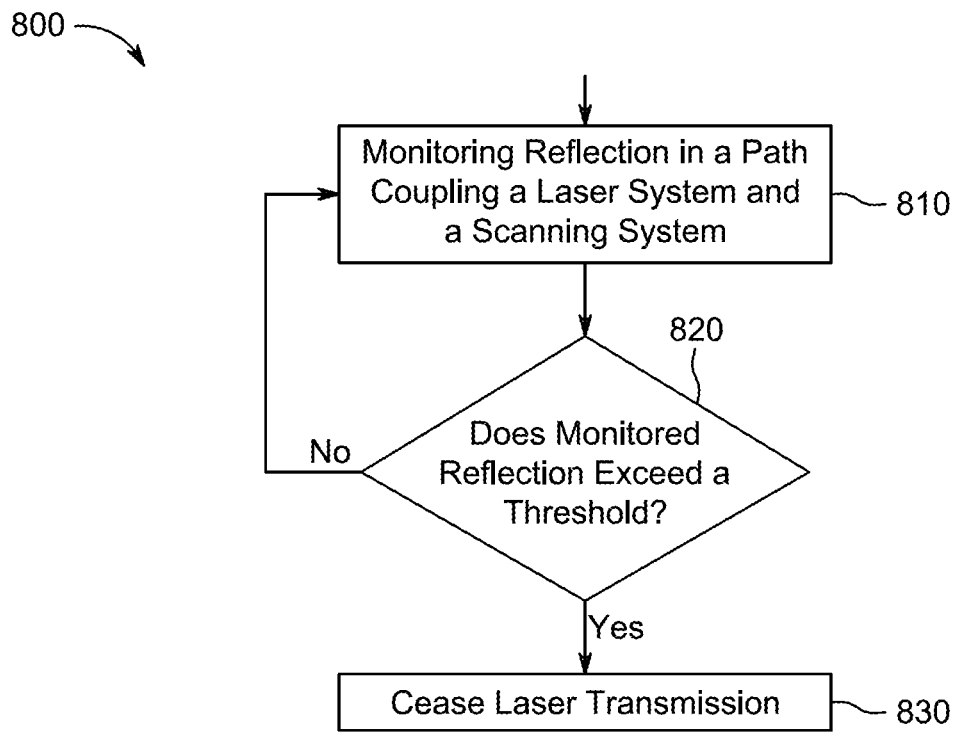
FIG. 8 shows illustrative process for monitoring a laser transmitter system for proper operation, according to an embodiment.
Figure 9:
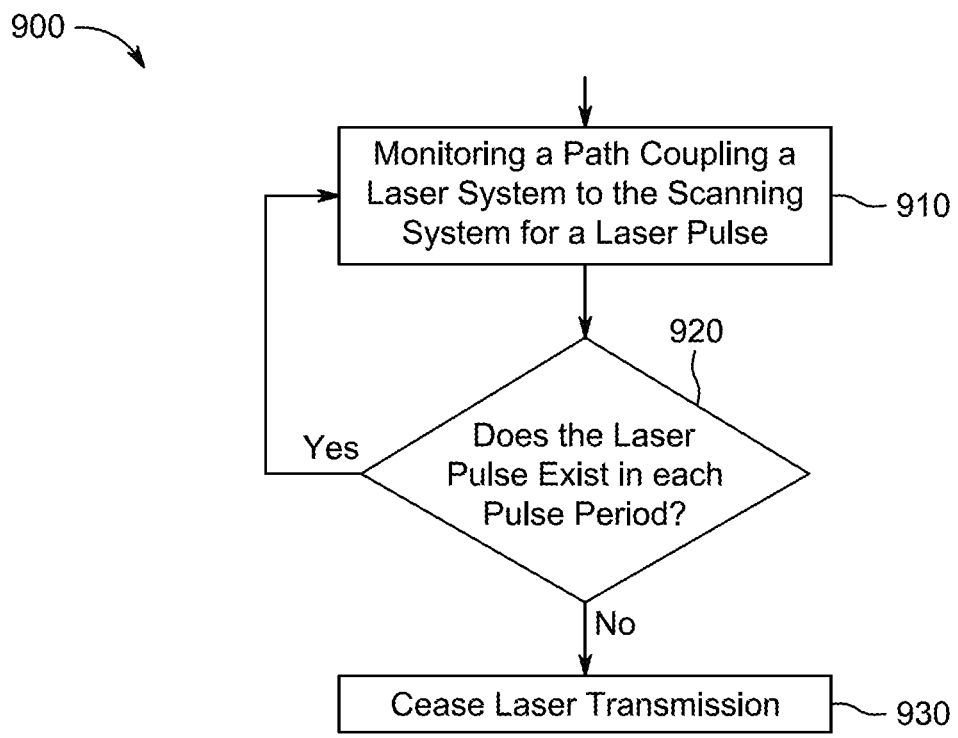
FIG. 9 shows another illustrative process for monitoring a laser transmitter system for proper operation, according to an embodiment.

If the determination at step 622 is YES, process 600 may proceed to step 630 and activate the laser transmitter system. When laser transmitter system is activated, laser pulses may be directed to mirrors and steering optics in a scanning system and the LiDAR system can begin observing its environment. At step 640, process 600 determines whether the first and second motors are operating properly. FIG. 7, described below, provides additional details on how this determination is made. If the determination is YES, process 600 may proceed to step 650, wherein a determination is made whether the laser transmitter system is operating properly. FIGS. 8 and 9, described below, provide additional details on how this determination is made. If the determination at step 650 is YES, process 600 may loop back to step 640. If the determination at step 640 or step 650 is NO, process 600 may deactivate laser transmitter system at step 660.

It should be understood that the steps in FIG. 6 are merely illustrative and that additional steps may be added and the order to the steps may be rearranged.

FIG. 7 shows an illustrative process 700 for monitoring mirrors for proper operation according to an embodiment. At step 710, encoder data is received from a first motor. For example, the first motor can be motor 232 and encoder 233 may provide the encoder data. At step 720, a determination is made as to whether the first motor encoder data satisfies first motor criteria. The encoder data provides a substantially instantaneous observation of the motor's operating characteristics. When the motor is operating normally, the encoder provides an uninterrupted series of pulse signals to signify that that is operating properly. If the motor experiences a slow down or decrease in velocity, the sequence of pulse signals changes in its frequency. A decrease in frequency is immediately detected and can serve as a fault event that causes the system to cease laser transmission. If the criteria at step 720 are satisfied, process 700 returns to step 710. If the criteria is not satisfied, process 700 may cease laser transmission at step 750.

At step 730, encoder data is received from a second motor. For example, the second motor can be motor 242 and encoder 243 may provide the encoder data. At step 740, a determination is made as to whether the first motor encoder data satisfies first motor criteria. If the criteria at step 740 are satisfied, process 700 returns to step 730. If the criteria are not satisfied, process 700 may cease laser transmission at step 750. The second motor encoder criteria may be different than the first motor encoder criteria. It should be appreciated that if either the first or second motors are compromised in their operation, the laser transmitter system is shut down.

It should be understood that the steps in FIG. 7 are merely illustrative and that additional steps may be added and the order to the steps may be rearranged. For example, in some embodiments, when the LiDAR system uses only one motor as part of its scanning system, process 700 can be modified to monitor encoder data from only one motor.

FIG. 8 shows illustrative process 800 for monitoring a laser transmitter system for proper operations. In particular, process 800 may be implemented by laser transmitter system 400 (of FIG. 4). At step 810, reflection in a path coupling a laser system and a scanning system is monitored. For example, the path can be a fiber optic cable (e.g., cable 430). At step 820, a determination is made as to whether the monitored reflection exceeds a threshold. If the threshold is exceeded, process 700 may cause laser transmitter system to cease operation (at step 830). If the threshold is not exceeded, process 700 may return to step 810.

It should be understood that the steps in FIG. 8 are merely illustrative and that additional steps may be added and the order to the steps may be rearranged.

FIG. 9 shows illustrative process 900 for monitoring a laser transmitter system for proper operations according to an embodiment. In particular, process 900 may be implemented by laser transmitter system 500 (of FIG. 5). At step 910, a path coupling a laser system to a scanning system is monitored for a laser pulse. At step 920, a determination may be made as to whether a laser pulse is observed for each expected pulse period. If the determination is YES, process 900 returns to step 910. If the determination is NO, the laser transmitter system is instructed to turn off at step 930.

It should be understood that the steps in FIG. 9 are merely illustrative and that additional steps may be added and the order to the steps may be rearranged.

Figure 10:
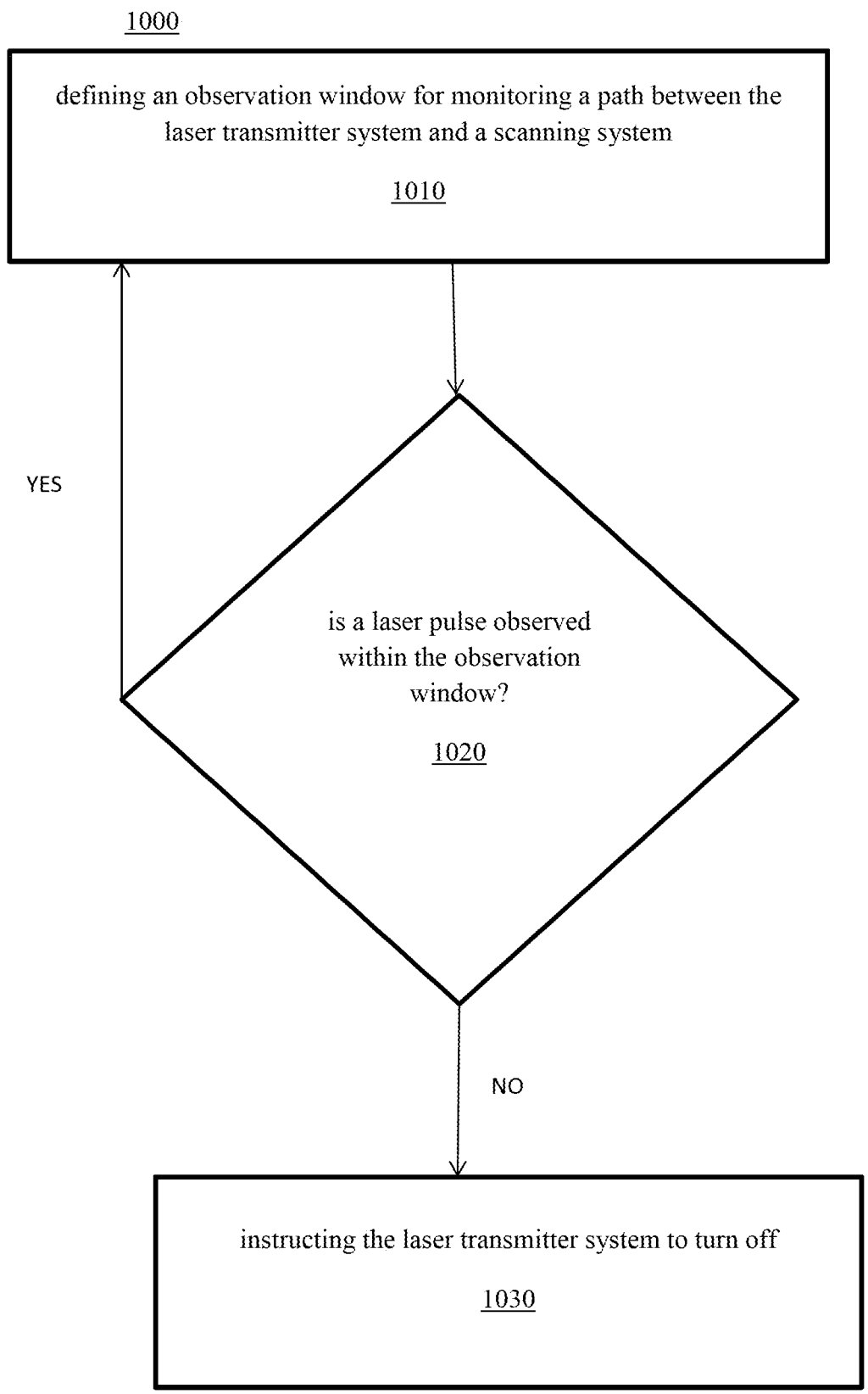
FIG. 10 shows illustrative process 1000 for monitoring a laser transmitter system for proper operations according to an embodiment.

FIG. 10 shows illustrative process 1000 for monitoring a laser transmitter system for proper operations according to an embodiment. In particular, process 1000 may be implemented by laser transmitter system 500 (of FIG. 5). At step 1010, an observation window is defined for monitoring a path between the laser transmitter system and a scanning system. The observation window can be less than a millisecond. Using an observation window to monitor for pulses as opposed to monitoring for each pulse may reduce the potential for false positives. At step 1020, a determination may be made as to whether a laser pulse is observed within the observation window. If the determination is YES, process 1000 returns to step 1010. If the determination is NO, the laser transmitter system is instructed to turn off at step 1030.

It should be understood that the steps in FIG. 10 are merely illustrative and that additional steps may be added and the order to the steps may be rearranged.

Example

In this example, the following assumptions apply. The laser is a 1550 nm pulsed laser with nominal average power of 1 W. The pulse period ranges between 1-5 ns and the repetition rate is 1 MHz. The beam size is assumed to be 1 mm, and the residual divergence is assumed to be 1 mrad. The scanning system's field of view has 100 degree horizontal range and a 40 degree vertical range. Calculations are made based on the IEC 60825.1-2007 protocol. Further assume that the example operates in a two mirror scanning system and that a measurement plane is 100 mm from the second mirror, and a 1 mm aperture exists at the measurement plane. The reaction time for a 1 mm aperture at a distance of 100 mm for 1550 nm laser is less than 0.35 seconds. The horizontal spacing between pulses is approximately 1.57 μm and the vertical spacing between pulses is approximately 0.25 mm. If a first mirror (e.g., mirror 230) stops, the laser pulse repeats every 0.1 seconds, which enables approximately 637 pulses to pass through the aperture each cycle. If a second mirror (e.g., mirror 240) stops, the laser pulse repeats every 278 μs, which enables approximately 4 pulses to pass through the aperture each cycle. If both mirrors stop, the measurement plane is 2 meters away and the laser beam will hit the same spot every 1 μs.

When the first mirror (e.g., mirror 230) stops, there is 2.5mJ of energy passing through the aperture each 0.1 second period. Further calculations show that it takes about 3 seconds to exceed the laser exposure safety limit. When the second mirror (e.g., mirror 240 stops), there is 5mJ of energy passing through the aperture each 278 μs period. Further calculations show that it takes about 0.75 seconds to exceed the laser exposure safety limit. When both mirrors stop operating, calculations show that it takes about 8 ms to exceed the laser exposure safety limit. In a worst case scenario, if both mirrors are at a full stop, it only takes 8 ms for the laser to exceed its exposure safety limit. The embodiments discussed herein provide the necessary monitoring capabilities and laser shutdown capabilities to prevent unsafe laser exposure.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-9, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, filnctionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A light detection and ranging (LiDAR) system, comprising:
    a transmitter system comprising a fiber laser;
    a scanning system comprising:
        at least a first mirror operative to move according to a first motor motion, wherein the at least the first mirror at least partially controls directionality of laser pulses originating from the fiber laser; and
        monitoring circuitry operative to:
        monitor the first motor motion and the transmitter system for a fault condition;
        detect occurrence of the fault condition; and
        instruct the fiber laser to shut down in response to a detected fault condition.

2. The LiDAR system of claim 1, wherein the scanning system further comprises a second mirror operative to move according to a second motor motion, wherein the first and second mirrors control directionality of laser pulses originating from the fiber laser, and where the monitoring circuitry is further operative to:
    monitor the first motor motion, the second motor motion, and the transmitter system for a fault condition.

3. The LiDAR system of claim 2, wherein a first fault condition is improper operation of the first mirror, and, wherein a second fault condition is improper operation of the second mirror.

4. The LiDAR system of claim 3, wherein a third fault condition is improper operation of the transmitter system.

5. The LiDAR system of claim 1, wherein the transmitter system comprises:
    a fiber optic cable; and
    a detector for observing reflectance in the fiber optic cable, and wherein the monitoring circuitry is operative to monitor observed reflectance to detect occurrence of the fault condition.

6. The LiDAR system of claim 5, wherein the fault condition occurs when the observed reflectance passes a threshold.

7. The LiDAR system of claim 1, wherein the transmitter system comprises:
    a fiber optic cable; and
    a detector for observing laser pulses in the fiber optic cable, and wherein the monitoring circuitry is operative to monitor observed laser pulses to detect occurrence of the fault condition.

8. The LiDAR system of claim 7, wherein the fault condition occurs when a laser pulse is not observed within an expected laser pulse period.

9. The LiDAR system of claim 1, wherein the transmitter system comprises a seed laser, at least one amplifier, and an amplified spontaneous emission (ASE) filter.

10. The LiDAR system of claim 9 wherein the ASE filter is operative to filter out out-of-band spontaneous emissions having wavelengths that cannot pass through the ASE filter.

11. The LiDAR system of claim 10, wherein in response to a shutdown instruction, the seed laser is substantially immediately deactivated and wherein the ASE filter reduces energy output of the fiber laser to a safe emission level within a fixed time period.

12. A method for operating a light detection and ranging (LiDAR) system, comprising:
    controlling movement of a first mirror according to a first motion;
    activating a laser transmitter system comprising a fiber laser, wherein the fiber laser transmits light pulses that are projected according to a field of view defined by the controlled movements of at least the first mirror;

monitoring movement of the first mirror and operation of the transmitter system for a fault condition;

detecting occurrence of the fault condition; and turning the fiber laser off in response to a detected fault condition.

13. The method of claim 12, further comprising:

controlling movement of a second mirror according to a second motion;

wherein the monitoring comprises monitoring movement of the first mirror, movement of the second mirror, and operation of the transmitter system for a fault condition.

14. The method of claim 12, wherein a first fault condition is improper movement of the first mirror, and wherein a second fault condition is improper movement of the second mirror.

15. The method of claim 14, wherein a third fault condition is improper operation of the transmitter system.

16. The method of claim 12, wherein the transmitter system comprises:

a fiber optic cable; and a detector for observing reflectance in the fiber optic cable, and the method further comprising monitoring observed reflectance to detect occurrence of the fault condition.

17. The method of claim 16, wherein the fault condition occurs when the observed reflectance passes a threshold.

18. The method of claim 12, wherein the transmitter system comprises:

a fiber optic cable; and a detector for observing laser pulses in the fiber optic cable, and the method further comprising monitoring observed laser pulses to detect occurrence of the fault condition.

19. The method of claim 18, wherein the fault condition occurs when a laser pulse is not observed within an expected laser pulse period.

20. The method of claim 12, wherein the transmitter system comprises a seed laser, at least one amplifier, and an amplified spontaneous emission (ASE) filter.

21. The method of claim 20, further comprising filtering out, using the ASE filter, out-of-band spontaneous emissions having wavelengths that cannot pass through the ASE filter.

* * * * *

UNITED STATES PATENT AND TRADEMARK OFFICE
CERTIFICATE OF CORRECTION

| | |
|---|---|
| PATENT NO. | : 11,567,182 B2 |
| APPLICATION NO. | : 16/295803 |
| DATED | : January 31, 2023 |
| INVENTOR(S) | : Yufeng Li et al. |

It is certified that error appears in the above-identified patent and that said Letters Patent is hereby corrected as shown below:

In the Specification

At Column 4, Line 43, "transceiver module 220" should be replaced with --receiver system 220--
At Column 4, Line 45, "transceiver module 220" should be replaced with --receiver system 220--

Signed and Sealed this
Ninth Day of April, 2024

Katherine Kelly Vidal
*Director of the United States Patent and Trademark Office*